UNITED STATES PATENT OFFICE.

JOHN R. KINDER, JR., OF LADD, ILLINOIS.

SOLDER.

1,252,010.  Specification of Letters Patent.  Patented Jan. 1, 1918.

No Drawing.  Application filed May 31, 1917.  Serial No. 172,002.

*To all whom it may concern:*

Be it known that I, JOHN R. KINDER, Jr., a citizen of the United States, residing at Ladd, in the county of Bureau and State of Illinois, have invented certain new and useful Improvements in Solder, of which the following is a specification.

This invention relates to an improved solder, and more particularly to a solder for aluminum, tin, galvanized iron, brass, and like metals, the invention having for its primary object to provide an inexpensive solder which will securely join together such metals.

It is another object of my invention to provide a solder which may be used in the manner of the ordinary lead solder, and which in its application to the metal parts, and particularly aluminum, will stick or adhere thereto.

With the above and other objects in view, the invention consists in the following named ingredients mixed together in the manner and in the proportions stated.

My improved solder is composed of lead, zinc, block tin, and commercial solder which consists of equal proportions of lead and tin. In mixing these several metals together the pot or crucible is first thoroughly cleaned by melting tallow therein, and 28.7% of lead; 24.5% of pure zinc; and 32.8% of pure block tin, together with 14% of the commercial solder are then melted together in the crucible. Thus the composite alloy will contain 35.7% of lead and 39.8% of tin. These several metals are thoroughly mixed and boiled together and are finally drawn off through a fine screen so that all of the sediment and foreign matter is removed therefrom. The metal is then poured into molds and allowed to cool and harden.

My improved solder is used in the ordinary manner. The metal parts of aluminum, iron, brass, or other metals, are first cleaned to remove all grease or dirt therefrom, tallow preferably being used for this purpose instead of acids, as the latter will stain the metal so that it is hard to polish. My improved solder is then melted and applied to the metal parts in the usual way. The solder will immediately stick or adhere to aluminum or other metals upon which the ordinary lead solder will not remain and harden.

In testing my improved solder, I have found that by using the alloy consisting of equal portions of lead and tin, there will be a very easy and even flow of the solder with the application of less heat than would otherwise be the case, and the solder would also give a smoother finish. I have also discovered that in connecting parts of aluminum, my improved solder may be applied to the edges of broken parts or pieces and joined together by then applying the ordinary solder consisting of equal parts of lead and tin over the connected ends or edges. A stronger joint or union is obtained, but with less expense, as the ordinary solder without the zinc, may be procured at appreciably less cost. By the addition of the ordinary solder to the lead, zinc and tin in the proportions above stated, I have found that a far stronger joint or connection between the parts is produced than when the lead tin alloy is omitted. I am aware of the fact that certain animal and vegetable oils either with or without the addition of mineral ingredients thereto have heretofore been used as a flux for soldering aluminum but my invention distinctly differs from such compositions, in that only the three metals, lead, tin and zinc are employed. The zinc being an affinitive for the aluminum, holds the fluxing alloy upon the aluminum parts so that when the ordinary commercial solder is subsequently applied it will immediately unite with the lead and tin in the composition and quickly set to provide a firm solid joint. By the use of zinc in the composition, in the proportion above stated, I have found that a connection of greater strength and rigidity between the aluminum parts may be obtained than in the use of such fluxing compositions as I have above referred to. By the use of the several constituents in the relative proportions stated, the composition will not be dry and brittle, as I have found to be the case with other fluxing and welding compositions where the portions of lead and tin used are less than are used in my improved composition. By proportioning the several metal constituents as herein stated, the resultant composition when solidified will be flexible whereas when the fluxing composition is hard and brittle, it will work gummy under t' soldering iron and there will be a great w ste of the material. I have found that the best results are obtained when the several ingredients are mixed together in the proportions above stated, but it will of course be understood that these proportions in practice may vary to some extent. These ingredients may be obtained at nominal cost so that my improved soldering compound may be inexpensively produced.

Having thus fully described my invention, what I desire to claim and secure by Letters Patent is:

The herein described solder consisting of lead 35.7%, pure zinc 24.5% and tin 39.8%.

In testimony whereof I hereunto affix my signature in the presence of two witnesses.

JOHN R. KINDER, Jr.

Witnesses:
DONALD CAHILL,
A. W. LOGAN.